United States Patent [19]
Masucci

[11] Patent Number: 5,395,420
[45] Date of Patent: Mar. 7, 1995

[54] PROCESS FOR USING FOAMED SLAG IN STAINLESS STEEL PRODUCTION

[75] Inventor: Pasquale Masucci, Rome, Italy

[73] Assignee: Centro Sviluppo Materiali S.p.A., Rome, Italy

[21] Appl. No.: 159,550

[22] Filed: Dec. 1, 1993

[51] Int. Cl.$^6$ .............................................. C21C 7/00
[52] U.S. Cl. ..................... 75/10.41; 420/71; 420/116
[58] Field of Search ............... 75/10.41; 420/71, 116

[56] References Cited

U.S. PATENT DOCUMENTS

| | | | |
|---|---|---|---|
| 2,422,299 | 6/1947 | Fink | 420/116 |
| 3,366,474 | 1/1968 | Akita | 420/71 |
| 3,483,671 | 12/1969 | Wiemer | 55/136 |
| 3,615,348 | 10/1971 | Tanczyn | 420/71 |
| 3,791,819 | 2/1974 | Loutzenhiser | 420/116 |
| 4,247,307 | 1/1981 | Chang | 55/2 |
| 4,587,807 | 5/1986 | Suzuki | 60/274 |
| 4,741,746 | 5/1988 | Chao et al. | 55/117 |
| 5,263,317 | 11/1993 | Watanabe et al. | 60/275 |

FOREIGN PATENT DOCUMENTS

| | | |
|---|---|---|
| 0083845 | 7/1983 | European Pat. Off. . |
| 0162679 | 11/1985 | European Pat. Off. . |
| 2634787 | 2/1990 | France . |
| 4114935 | 11/1991 | Germany . |
| 792603 | 4/1958 | United Kingdom . |

OTHER PUBLICATIONS

Patent Abstracts of Japan, "Method for Producing Chromium-Contained Steel," vol. 13, No. 504, Nov. 13, 1989.
Patent Abstracts of Japan, "A Method for Adding Chromium to Arc Furnace," vol. 12, No. 263, Jul. 22, 1988.

*Primary Examiner*—Peter D. Rosenberg
*Attorney, Agent, or Firm*—Oliff & Berridge

[57] ABSTRACT

In the production of stainless steels, it is possible to use foamed slag, with great advantages, by using a metal charge with specific carbon and silicon contents, by insufflating limestone and carbon, by controlling the amount of employed oxygen and by maintaining the basicity index of the slag within specific values.

4 Claims, No Drawings

PROCESS FOR USING FOAMED SLAG IN STAINLESS STEEL PRODUCTION

DESCRIPTION

1. Field of the invention

The present invention relates to a process for using foamed slag in stainless steel production and more specifically concerns the reduction of consumption of power, of wall refractory, of the Furnace and of the electrodes, as well as increasing output and production optimization by means of using foamed slag.

2. Prior art

In steel production with an electric furnace, the furnace itself is Filled up with metal scrap of suitable composition, the electrodes are lowered and the electric current starts to Flow. The scrap just below the electrodes is melted first and the electrodes are lowered accordingly. When the electrodes are in their standard working position a great amount of not yet molten metal surrounds them, interposing between the electrodes and the furnace walls, which walls are thus sheltered from the radiation of arcs, which are at a temperature ranging between 6,000° C. and 10,000° C., a temperature much higher than the maximum temperature at which the refractory material constituting the walls of the furnace is resistant.

However, when a large amount of scrap is molten, the walls are no longer sheltered and are thus exposed to the destroying action of the radiation of arcs.

Such drawback was traditionally amended by reducing the furnished electric power, by lowering the voltage to the electrodes and by shortening the length of the electric arcs, which thus were, at least partially, sheltered by the slag thickness, which is naturally present on the surface of the metallic molten bath. Such action saves the refractory material but lengthens the treating times in the furnace and increases the electrodes and energy consumption. In the production of carbon steels with an electric furnace it has been long recognized that the use of the so-called foamed slag by introducing carbon or coke in the slag onto the bath and oxygen in the bath itself; the carbon or coke reducing iron oxide to iron, thus producing carbon dioxide, while oxygen reacts with the carbon in the bath, thus forming further carbon dioxide. Such a gas, by bubbling through the slag layer, foams it up and thus largely increases its volume. The foamed slag envelops the electrodes and interposes between the electric arcs and the walls of the furnace.

It is thus possible to keep the arc power at maximum values by using very high voltage with lower currents and longer arcs, with a consequent increase of furnace output, lower thermic losses, lower consumption of electrodes and electric power.

However, the technique of the foamed slag has not found an application in stainless steel production, essentially because during their melting the amount of iron oxide in the slag, typically around 1-3%, is largely insufficient to produce foamed slags, and because the oxygen insufflation produces chromium oxidation, thus creating the need of further additions of it, which results in an increase of production costs.

Furthermore, the quite high amount of chromite and the very low amount of iron oxide renders the slag scarcely fluid and homogeneous and produces imperfectly molten aggregates having various dimensions, thus preventing in any case the foaming.

In consequence, the present state of the art expressly denies the possibility of using foamed slag in the production of stainless steel, only allowing to obtain a balance, within certain limits, between the reduction of the consumption of the walls of the furnace and the increase of the production costs due to electric power and to an increase in electrode consumption.

SUMMARY OF THE INVENTION

The purpose of the present invention is to allow the use of foamed slag in stainless steel production.

A further purpose of the present invention is to optimize stainless steel production by increasing the working period of the furnace by reducing wall consumption, as well as reducing electrodes and electric power consumption.

Another purpose of the present invention is to reduce production costs by reducing chromium oxidation in the metallic bath.

A further purpose of the present invention is to increase the process output.

DETAILED DESCRIPTION OF THE INVENTION

The process according to the present invention for using foamed slag in the production of stainless steel from electric furnace molten baths is characterized by the co-operation of the following operative steps:

- placing into the furnace a charge comprising scrap, a Fe-Si alloy, a Fe-Cr alloy and at least a component selected from carbon and coke;
- incorporating into the slag a mixture of at least a component selected from carbon and coke with limestone, with a limestone/carbon ratio in the mixture ranging between 0.1 and 5;
- maintaining in said charge the total amounts of carbon and silicon respectively ranging between 0.7 and 2.5 and between 0.6 and 1.1% by weight, in any case as a function of the amount of the blown oxygen;
- to insufflate oxygen with a flow rate ranging between 15 and 30 $Nm^3/h$ per ton of steel in the bath and in amount ranging between 5 and 20 $Nm^3$ per ton of steel; and
- maintaining the basicity index of the slag within values ranging between 1.4 and 2; the further process steps being the usual ones employed for the stainless steel production.

It is possible to add carbon and silicon amounts higher than those indicated if it is possible to operate with higher amounts of insufflated oxygen and, above all, if it is possible to finish the production process with high carbon amounts inside the bath, however under normal working conditions the above mentioned values of carbon and silicon amounts, as well the amounts of oxygen have proved perfectly suitable.

Carbon and silicon amounts lower than the ones indicated cannot avoid chromium overoxidation, particularly when high oxygen amounts are blown, whereas higher carbon amounts need too long treating times in the electric furnace or in the further treatment in an AOD furnace for their removal.

Higher silicon values involve insufficient basicity indexes with consequent erosion of the electric furnace refractory material, but can be counterbalanced by further additions of calcium oxide, and the subsequent waste of energy for its melting.

Oxygen amounts as indicated are suitable for a standard production, even though it is possible to change them to comply with particular process conditions which are going to be used; however, it must be taken into consideration that, in any case, consumptions higher than the ones mentioned above must be adequately counterbalanced by higher carbon additions to the bath, at least producing a increase of costs.

The oxygen insufflation begins as soon as a suitable amount of liquid bath is formed and, naturally, it contributes to minimize the electric power consumption, owing to the heat developed during combustion, mainly by carbon.

As far as the basicity index is concerned, it is noted that even though slightly higher values than the ones indicated can be used, much higher values lead to too dense slags which hardly Foam, while values lower than the minimum indicated above produce, as hinted, attacks on the furnace refractory material.

The slags produced according to the invention foam easily and well, owing to the carbon dioxode produced by the following reactions: i) combustion of the carbon dissolved in the bath, ii) between the carbon added as carbon and/or coke and the chromite, in the slag, iii) between limestone and carbon, in the slag.

It is to be noted that the carbon and silicon added protect chromium from oxidation.

The vigorous mixing of the slag induced by the bubbling of carbon dioxide promotes its homogenization and its quick complete melting, thus improving the inherent characteristics suited for a good foaming. Such effect is improved in that chromium oxide not dissolved in the slag, liquid near to the electric arc, is diffused in all the slag and Far From the arc it solidifies in the shape of very little crystals which contribute to stabilize the Foamed layer of the slag itself.

Carbon (or coke) and limestone can be added basically in two ways:

- pneumatic insufflation in the slag by means of a specific duct inserted, i.e., through the scorification port of the furnace, as a mixture with granular size ranging between 0.01 and 5 mm;
- introduction from the 5th opening of the vault furnace, as ovules consisting in part of carbon or coke and limestone and in part of carbon or coke alone.

By operating according to the above teaching, the aforementioned advantages can be reached. The foamed and firm slag protects the refractory material from erosion caused by the exposure to the irradiation of the electric arc; it is thus possible to keep the arc long, lower the current and minimize the electric power consumption; as a consequence the consumption of the electrodes is minimized; the chromium losses are reduced; and the production times and productivity are optimized.

EXAMPLE

The present invention will be now described in connection with a practical production test in an industrial plant with a charge (consisting of 140 tons of stainless steel scrap and carbon steel, of chromium iron alloy and of 5 tons of calcium oxide) with the following % by weight content of the more interesting elements according to the invention:

C 0.9; Si 0.8; Cr 18;

and introduced into the furnace with two subsequent additions, called "baskets".

The first basket consisted of 75 tons of scrap with C and Si amounts respectively of 0.4 and 0.8% b.w., and of 2 tons of CaO.

After supply of 100 kWh/t, a mixture consisting of 600 kg of carbon, with 70% b.w. of C, and 500 kg ovules consisting of limestone for 40% b.w. and coke for 60% b.w., 85% b.w. in C, with granular sizes ranging between 0.1 and 2 mm. was added through the 5th opening of the vault furnace. The flow rate of this addition was 100 kg/min. After two minutes from the starting of addition of ovules, the foaming of the slag started.

To the second basket, weighing 65 ton of scrap, with C and Si amounts respectively of 1.4 and 0.75% b.w., after supply of 70 kWh/t, 500 kg of Fe-Si at 65% were added from the 5th opening. At about 100 kWh/t a mixture consisting of 1000 kg of carbon, at 70% b.w. of C, and 1000 kg of ovules of limestone and coke were added, as indicated for the first basket, with a flow rate of 100 kg/min. At about 250 kWh/t the foaming became excessive; as a consequence the flow rate of the mixture was lowered to 60 kg/min and the Furnace was slightly tilted to prevent the foam from coming out of the scorification port.

400 $Nm^3$ oxygen were insufflated in the first basket with a low rate of 2500 $Nm^3/h$; 1600 $Nm^3$ oxygen were insufflated in the second basket with a flow rate of 3200 $Nm^3/h$.

The basicity index at the end of the castings was 2.

The advantages obtained in terms of consumption of refractory material, of electrodes, of electric power, of output, of chromium yield after a series of castings performed according to the described teachings and in any case within the limits of the present invention, can be thus summed up:

- Reduction of power consumption: 5%;
- Reduction of refractory material consumption: 44%;
- Reduction of consumption of electrodes: 15%;
- Increase in productivity: 22%;
- Increase in chromium yield: 23%

I claim:

1. A process for using foamed slag in the production of stainless steel in an electric arc furnace, comprising the cooperation of the following steps:
    (a) placing into the furnace a charge comprising scrap, a Fe-Cr alloy, a Fe-Si alloy and at least one component selected from the group consisting of carbon and coke, maintaining a carbon total amount between 0.7 and 2.5% b.w. and maintaining a silicon total amount between 0.6 and 1.1% b.w.;
    (b) forming a slag;
    (c) placing into the slag a mixture of at least one component selected from the group consisting of carbon and coke with limestone, with a limestone/carbon ratio in the mixture ranging between 0.1 and 5 and granular size ranging between 0.01 and 5 mm;
    (d) insufflating oxygen with a flow rate ranging between 15 and 30 $Nm^3/h$ per ton of steel in the bath and in an amount ranging between 5 and 20 $Nm^3$ per ton of steel; and
    (e) maintaining the basicity index of the slag within values ranging between 1.4 and 2;
    wherein said steps (a)-(e) are performed while melting said charge.

2. The process for using foamed slag of claim 1, wherein said steps (a)–(e) are sequential in the order stated.

3. A process for using foamed slag in the production of stainless steel in an electric arc furnace, comprising the cooperation of the following steps:
- (a) placing into the furnace a charge comprising scrap, a Fe-Cr alloy, a Fe-Si alloy and at least one component selected from the group consisting of carbon and coke;
- (b) forming a slag;
- (c) placing into the slag a mixture of at least one component selected from the group consisting of carbon and coke with limestone;
- (d) insufflating oxygen; and
- (e) maintaining the basicity index of the slag within values ranging between 1.4 and 2;

wherein said steps (a)–(e) are performed while melting said charge.

4. The process for using foamed slag of claim 3, wherein said steps (a)—(e) are sequential in the order stated.

* * * * *